United States Patent Office 2,769,200
Patented Nov. 6, 1956

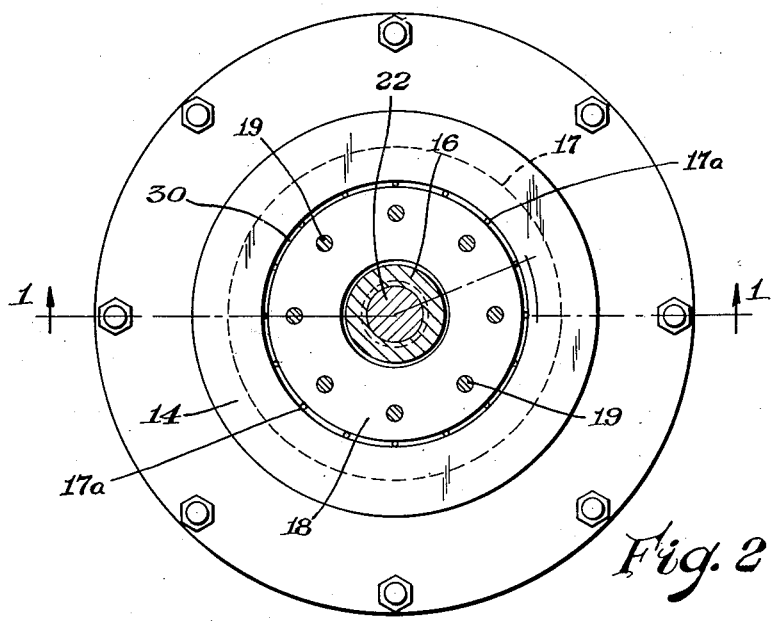
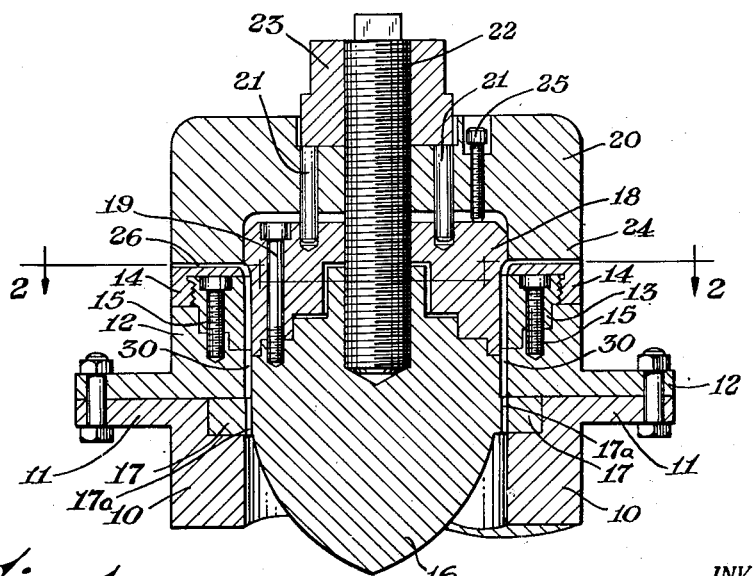

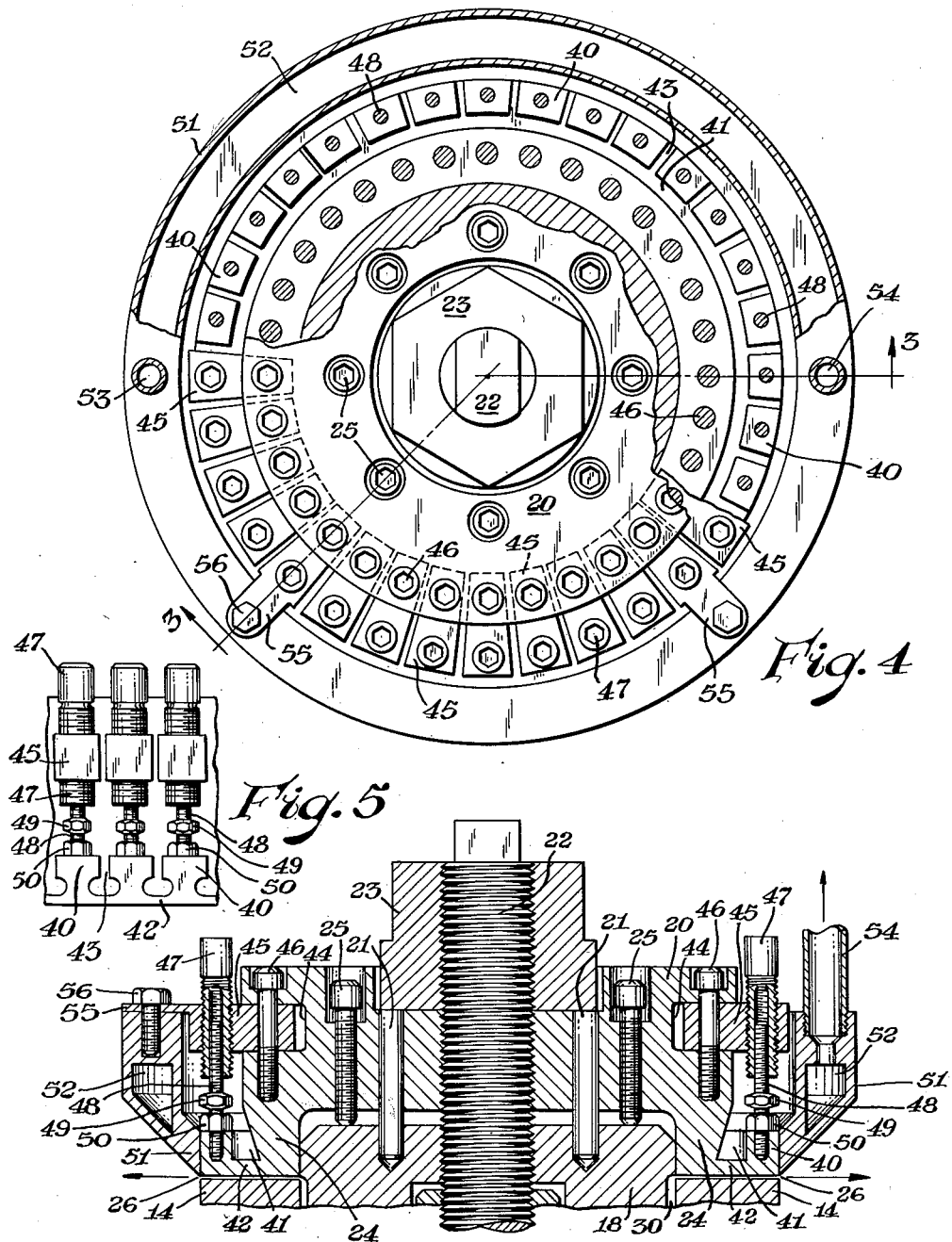

2,769,200
RADIAL EXTRUSION DIE

Murrey O. Longstreth and James E. Tollar, Midland, Mich., assignors to The Dow Chemical Company, Midland, Mich., a corporation of Delaware Application March 7, 1955, Serial No. 492,439

1 Claim. (Cl. 18—12)

This invention relates to an extrusion die for use with organic thermoplastic film-forming materials, adapted to effect extrusion in a plane radially in all directions about a center.

The ability of an extrusion machine to produce organic plastic film has been limited in the past not so much by the potential capacity of the apparatus to move enough of the plastic in a given period of time as by the practical dimensional limitations of the orifices with which the machine could be fitted. Plastic sheeting has been extruded from linear orifices and, except for a limited amount of transverse stretching which could be applied to the sheet, the length of the orifice has determined the width of the extruded sheet. Another prior practice has been to extrude the plastic material as a tube, and to expand the tube by mechanical, pneumatic or hydraulic means, and then to slit the tube longitudinally so that it could be opened out to form a flat sheet. In such practice, all other factors being equal, the circumference of the tube-forming orifice is directly related to the maximum attainable width of the resulting film. In the prior methods of extruding plastic sheets it has been necessary to extrude in a single direction, and this has resulted most commonly in sheets which exhibit evidences of greater orientation, and strength, in the direction of extrusion than in the transverse direction.

It would be desirable, and it is the object of this invention, to provide a form of extrusion die with an orifice capable of converting organic thermoplastic material to sheet form at any rate at which the associated extruder is capable of delivering plastic to the orifice. A related object is to provide a die having such an orifice which is not limited to the production of unidirectional extrusions. A specific object is to provide a die having an orifice capable of extruding the plastic material in a plane radially in all directions from a center.

The extrusion die of the present invention, whereby the foregoing and related objects are attained, is normally mounted on a vertical axis to receive the plastic material delivered either from below or above the die, and to discharge the plastic material in the form of a horizontally disposed unitary sheet radially about that axis. Basically, the new die assembly comprises a cylindrical extension of the discharge end of a plastic pump or extrusion machine, carrying an axial core or mandrel integral with said extension to provide a passageway of annular cross-section between the core and the cylindrical wall of the extension, and a concentric end closure mounted on the axial core and extending radially as far as the periphery of the cylindrical extension but spaced longitudinally therefrom to provide a horizontally disposed circumferential outlet for plastic material.

The use of the new die in association with a concentric polygonal film stretcher is disclosed by one of the present inventors and another in a concurrently executed application, Serial No. 493,178, filed March 9, 1955.

The invention will be described with respect to the annexed drawings, wherein

Fig. 1 is a vertical section through one embodiment of the new die taken along the line 1—1 of Fig. 2;

Fig. 2 is a cross-section of the same die taken along line 2—2 of Fig. 1;

Fig. 3 is a vertical midsection through the orifice and crown portions of an embodiment of the new die showing certain orifice adjusting means, taken along line 3—3 of Fig. 4;

Fig. 4 is a partially cut away end view of the die shown in Fig. 3; and

Fig. 5 is a fragmentary elevation showing details of one form of orifice adjusting means.

In the illustrated embodiments, the new die is mounted over the vertically directed cylindrical outlet 10 of the barrel of a plastics extruder or of a plastics pump, and is secured thereto by bolts 11. The die comprises three main functional elements, and these are a housing assembly, a core assembly, and a crown.

The housing assembly is an internally cylindrical extension of outlet 10. As illustrated it comprises a flanged base member 12, a collar ring 13 and a cap ring 14, the last having a rounded upper internal edge and polished inner and upper surfaces to provide a smooth land for the flow of plastic material. The collar ring 13 is secured to base member 12 as by bolts 15, and is externally threaded to engage the internal threads of cap ring 14.

The core assembly has as its essential element a spreader mandrel 16 coaxial with the housing assembly and positioned properly as by means of flange 17 which is rabbeted into the extruder outlet 10 and held fixedly in place by the base flange of extension 12, so that mandrel 16 and the base housing member 12 form a rigid structure. Flange 17 is perforated 17a for passage of plastic toward the orifice. Mandrel 16 is surmounted by a coaxial die block 18, the lower outer walls of which are cylindrical and spaced from inner walls of collar ring 13 to provide a uniform channel 30 of annular cross-section for plastic flow between the housing assembly and the core assembly. The upper portion of die block 18 is undercut to provide a smoothly rounded flare to guide the plastic material from its vertical course in the annular passageway 30 to a horizontal course over the upper surface of cap ring 14. Die block 18 is secured to mandrel 16 as by bolts 19.

The crown 20 spans die block 18 and is centered accurately thereon by dowel pins 21 and is secured thereto by a threaded axial pilot shaft 22 and lock nut 23 threaded to shaft 22. Crown 20 has a circumferentially dependent skirt 24 which abuts internally against the upper side wall of die block 18 and is closely spaced from the upper face of cap ring 14, the spacing therebetween being controlled by stud bolts 25. The space between cap ring 14 and the lower plane face of the skirt 24 of crown 20 constitutes a flat circumferential orifice 26 for the radial extrusion of a plastic sheet in a plane vertical to the axis of the die. Orifice 26 is smoothly continuous with the annular passageway 30 between the housing assembly and the core assembly.

Certain refinements of the apparatus, including means for heating the crown of the die and means for effecting precise local adjustments in the gauge of the circumferential orifice, are shown in and will be described with respect to Figs. 3–5.

In the embodiment shown in Figs. 3–5, the crown 20, which is centrally rigid, is circumferentially machined from the outer surface to provide a thinner circumferential flange 40 disposed exteriorly of dependent skirt 24, and flange 40 is machined to provide a circular groove 41 adjacent to skirt 24. Groove 41 is of such depth that the outer margin of flange 40 is joined to skirt 24 by a relatively thin and yieldable web 42. Flange 40 is also machined radially at frequent regular intervals about its circumference, to the same depth as groove 41, providing a series of alternate bosses 40 and radial grooves 43. Flange 40 is thus rendered locally yieldable to outside forces so that the thickness of orifice 26, between cap ring 14 and flange 40 may be adjusted locally, as required. Crown 20 is also grooved radially, in the horizontal plane, about its circumference above skirt 24 to provide a slot 44 into which are fitted a plurality of trapezoidal bars 45, each of which projects out over one of the solid members of flange 40. Each bar 45 is secured to crown 20 by bolts 46 and is drilled and tapped through to accommodate a coarse adjusting screw 47, centered over a flange member 40, and the flange member 40 is partially drilled and tapped to receive a fine adjusting screw 48 coaxial with and extending into internal threads in coarse adjusting screw 47. Each screw 48 may be turned by applying a wrench to its centrally located boss 49. Lock nuts 50 are mounted on the fine adjusting screws 48. Adjustment of the vertical penetration of screw 47 through bar 45, and of screw 48 into screw 47 effects a local alteration in the clearance between flange 40 and cap ring 14, and any such adjustment may be retained by locking nuts 50 against flange 40.

In the embodiment shown in Figs. 3 and 4, the crown 20, and especially the circumferential flange 40 and connecting webs 42 which form one face of orifice 26, are heated by conduction from close-fitting circumferential heating ring 51, illustrated as having an internal chamber 52 which may be supplied with steam or other heating fluid which may enter through inlet 53 and be exhausted through outlet port 54. Heating ring 51 may be secured to crown 20 as by a plurality of radial lugs 55 extending from a few of the bars 45 over ring 51, to which they are fastened by bolts 56 (Figs. 4).

In operation, the die receives molten plastic material from a pump or extruder outlet 10 and the plastic matter is distributed about mandrel 16, passing through multiple perforations 17a in flange 17 into the annular passageway 30 and being directed radially outwardly through the horizontally disposed circumferential orifice 26 between cap ring 14 and crown 20, as shown by arrows in Fig. 3. The resulting unitary sheet is brought to uniform gauge by adjustment of micrometric screws 47, 48 and nuts 50 which effect any necessary small alteration in the spacing between flange 40 of crown 20 and ring 14. Thereafter, so long as the temperature of the plastic is kept constant and other extrusion conditions are unaltered, the gauge of the extruded sheet remains uniform.

We claim:

A die head for the extrusion of organic thermoplastic sheet comprising an internally cylindrical housing adapted to serve as an extension of a means for supplying fused plastic matter continuously, an internal core coaxial with said housing and fixedly spaced therefrom to provide a passageway therebetween of annular cross-section and to distribute plastic matter substantially uniformly about said passageway, and a centrally rigid and circumferentially yieldable crown member secured to and spanning said core and coaxial therewith, said crown member having a plurality of adjustable pressure and tension means for altering controllably the orifice spacing between any portion of the inner circumferential face of the crown and the proximal opposed face of the housing, at least one of the core and crown members serving to divert the plastic matter from its longitudinal flow through the said annular passageway to a circumferentially radial orifice between a face of said member and the end of the said housing distant from the plastics supply means.

References Cited in the file of this patent

UNITED STATES PATENTS

| 1,484,961 | Peelle | Feb. 26, 1924 |
| 1,868,990 | Peelle | July 26, 1932 |
| 2,387,718 | Coleman | Oct. 30, 1945 |